United States Patent [19]

Ozaki

[11] Patent Number: 5,630,139
[45] Date of Patent: May 13, 1997

[54] PROGRAM DOWNLOAD TYPE INFORMATION PROCESSOR

[75] Inventor: Hirokazu Ozaki, Tokyo, Japan

[73] Assignee: NEC Corporation, Tokyo, Japan

[21] Appl. No.: 385,683

[22] Filed: Feb. 8, 1995

[30] Foreign Application Priority Data

Feb. 10, 1994 [JP] Japan .................. 6-037831

[51] Int. Cl.$^6$ .................................. G06F 9/44
[52] U.S. Cl. .................................. 395/712
[58] Field of Search .................. 395/700, 650

[56] References Cited

U.S. PATENT DOCUMENTS

| | | | |
|---|---|---|---|
| 4,459,662 | 7/1984 | Skelton et al. | 395/700 |
| 4,724,521 | 2/1988 | Carron et al. | 395/700 |
| 5,068,780 | 11/1991 | Bruckert et al. | 395/700 |
| 5,093,915 | 3/1992 | Platteter et al. | 395/700 |
| 5,210,875 | 5/1993 | Bealkowski et al. | 395/700 |
| 5,230,052 | 7/1993 | Dayan et al. | 395/700 |
| 5,269,022 | 12/1993 | Shinjo et al. | 395/700 |
| 5,274,816 | 12/1993 | Oka | 395/700 |
| 5,305,457 | 4/1994 | Takida et al. | 395/700 |
| 5,444,861 | 8/1995 | Adamec et al. | 395/700 |

FOREIGN PATENT DOCUMENTS 62-60001  3/1987  Japan .

*Primary Examiner*—Kevin A. Kriess
*Attorney, Agent, or Firm*—Foley & Lardner

[57]  ABSTRACT

An information processor includes a CPU, an EEPROM for storing a program for ordinary processing and program download control, and a RAM having a first program storage area for loading the program stored in the EEPROM and a second program storage area for storing a new downloaded program. In an idle time in the ordinary processing program, the CPU executes the download control program to download the new program from an external device into the second program storage area of the RAM and store the downloaded program in the EEPROM, while the CPU is reset after the storage of the program.

16 Claims, 5 Drawing Sheets

PROGRAM DOWNLOAD TYPE INFORMATION PROCESSOR

BACKGROUND OF THE INVENTION

1. Field of the Invention

The present invention relates to a program down-loading mode for downloading a new program into an information processor having a CPU operable under control of a computer program from an external device.

2. Description of the Related Art

There is a case where an information processor implementing a CPU operable under control of a computer program stored in a memory needs a newer version of its program or updating of the same for executing another processing. Storage of a new program into a memory is implemented by downloading the new program held in an external device via a communication line etc. and writing the program in a memory such as an EEPROM (Electrical Erasable Programmable Read Only Memory).

In downloading a new program into such a device as described above, an abnormal termination of the transfer of the program from the external device or an abnormality occurring in the device itself in the course of the transfer results in an incomplete program stored in the EEPROM or, in some instances the program being destroyed.

One of techniques for preventing such problems caused by an abnormality occurring during the down-loading of a program as mentioned above is recited in, for example, Japanese Laying-Open Patent Application No. 62-60001. Disclosed in the application is the program down-loading implemented, with an operating program stored in an EEPROM, by temporarily storing a program, which is downloaded from an external device, in a RAM (Random Access Memory) as a working area, and then rewriting the current program stored in the EEPROM into the downloaded new program under control of a program for program rewriting stored in a ROM (Read Only Memory), a memory different from the EEPROM. According to this program down-loading mode, since the EEPROM is neither erased nor programmed directly at the time of downloading a new program, it is possible to prevent the program stored in the EEPROM from being incomplete or being destroyed even if the transfer of the program from the external device abnormally terminates or abnormality occurs in the device itself in the course of the transfer.

In the above down-loading, however, because processing is executed under direct control of the program stored in the EEPROM, there is a possibility of malfunction occurring when the contents of the object memory are updated by down-loading during the operation under control of the current program. In downloading a new program in a conventional manner, therefore, it is necessary to stop ordinary processing under control of a current program.

SUMMARY OF THE INVENTION

A first object of the present invention is to provide a program down-loading mode allowing down-loading of a new program to be executed while ordinary processing is performed and operation to be quickly started under control of the downloaded new program upon completion of the down-loading.

A second object of the present invention is to provide a program down-loading mode allowing an operator to recognize normal completion and abnormal completion of down-loading with ease and a control device to be quickly restored as necessary to an original state before the down-loading of a new program.

According to one aspect of the invention, a program download type information processor comprises:

control means including a CPU for executing programmed control; and external storage means for storing a new program replacing a current program being executed by the CPU of said control means;

said control means including:

first storage means for storing a program for executing ordinary processing and program download control; and second storage means having a first storage area for loading the program stored in said first storage means to be executed by said CPU and a second storage area for storing a new program downloaded from said external storage means;

said CPU, at its activation, executing the ordinary processing under control of said program loaded from said first storage means into the first storage area of said second storage means; and said CPU executing download control by said program without stopping said ordinary processing, to download said new program stored in said external storage means into the second storage area of said second storage means and store said new program into said first storage means after the down-loading.

In the preferred construction, download control of said program is executed at a timing when an idle time is generated in said ordinary processing by said CPU.

In the preferred construction, the program download type information processor further comprises third storage means, at the activation, for storing an IPL program for loading said program from said first storage means into the first storage area of said second storage means and transferring the control to the ordinary processing under control of said loaded program.

In the preferred construction, download control of said program is executed at a timing when an idle time is generated in said ordinary processing by said CPU.

In said download control, with the new program in said external storage means being divided into a plurality blocks, the new program is downloaded into the second storage area of said second storage means on the basis of said block.

Also, the program download type information processor further comprises reset means for executing reset of said CPU at a time point when said new program downloaded from said external storage means into the second storage area of said second storage means is stored in said first storage means.

In the above-mentioned construction, the program download type information processor comprises input means for giving a request for downloading said new program to said CPU, said CPU executing download control of said program in an idle time of said ordinary processing when receiving the download request from said input means.

In the above-mentioned construction, the program download type information processor comprises input means for giving a request for downloading said new program to said CPU and demanding reset of said CPU;

notifying means for notifying normal completion and abnormal completion of down-loading of said new program; and reset means for executing reset of said CPU;

wherein in an idle time of said ordinary processing, said CPU executes download control of said program when receiving the download request from said input means;

at a time point when said new program downloaded from said external storage means into the second storage area of said second storage means is stored in said first storage means, said CPU notifies normal completion of the down-loading through said notifying means and said reset means executes reset of said CPU; and said CPU notifies abnormal completion of the down-loading through said notifying means when said new program is not normally downloaded from said external storage means into the second storage area of said second storage means.

According to another aspect of the invention, a program download type information processor comprising:

control means including a CPU for executing programmed control; and external storage means for storing a new program replacing a current program being executed by the CPU of said control means;

said control means including:

first storage means for storing a program for executing ordinary processing and program download control;

second storage means having a first storage area for loading the program stored in said first storage means to be executed by said CPU and a second storage area for storing a new program downloaded from said external storage means; and reception processing means connected to said external storage means via a communication medium for executing reception of said new program;

said external storage means including:

transmission processing means for executing transmission of said new program to said communication means;

said CPU, at its activation, executing the ordinary processing under control of said program loaded from said first storage means into the first storage area of said second storage means;

said CPU executing download control by said program without stopping said ordinary processing; and in download control, said CPU storing said new program received from said external storage means through said reception means in the second storage area of said second storage means and then storing said new program in said first storage means.

In the preferred construction, download control of said program is executed at timing when an idle time is generated in said ordinary processing by said CPU.

In the preferred construction, further comprising third storage means for, at the activation, storing an IPL program for loading said program from said first storage means into the first storage area of said second storage means and transferring the control to the ordinary processing under control of said loaded program.

Also, download control of said program is executed at timing when an idle time is generated in said ordinary processing by said CPU;

in said download control, with the new program in said external storage means being divided into a plurality blocks, the new program is downloaded into the second storage area of said second storage means on the basis of said block; and said CPU, at every reception of one block by said reception means, stores the received one block in the second storage area of said second storage means and then moves on to the ordinary processing under control of said program.

In the above-mentioned construction, further comprising reset means for executing reset of said CPU at a time point when said new program downloaded from said external storage means into the second storage area of said second storage means is stored in said first storage means.

In the above-mentioned construction, further comprising input means for giving a request for downloading said new program to said CPU, said CPU executing download control of said program in an idle time of said ordinary processing when receiving the download request from said input means.

In the above-mentioned construction, further comprising:

input means for giving a request for downloading said new program to said CPU and demanding reset of said CPU;

notifying means for notifying normal completion and abnormal completion of down-loading of said new program; and reset means for executing reset of said CPU;

in an idle time of said ordinary processing, said CPU executes download control of said program when receiving the download request from said input means;

at a time point when said new program downloaded from said external storage means into the second storage area of said second storage means is stored in said first storage means, said CPU notifies normal completion of the down-loading through said notifying means and said reset means executes reset of said CPU; and said CPU notifies abnormal completion of the down-loading through said notifying means when said new program is not normally downloaded from said external storage means into the second storage area of said second storage means.

In the above-mentioned construction, further comprising input means for giving a request for downloading said new program to said CPU and reset means for executing reset of said CPU, wherein said CPU executes download control of said program when an idle time is generated in said ordinary processing, and within the idle time of said ordinary processing, when a download request is generated from said input means, sends a request for receiving said new program to said reception mean;

said reception means, upon receiving the reception request, sends a transmission request to the transmission means of said external storage means;

said transmission means, upon receiving said transmission request, divides the new program in said external storage means into a plurality of blocks and sequentially transmits the program on the basis of said block to said reception means;

said reception means, at every reception of one block, sends a request for writing the block to said CPU;

said CPU stores said received block in the second storage area of said second storage means in response to said writing request; and said CPU, in response to notice of reception completion of all blocks given by said reception means, stores said new program stored in the second storage area of said second storage means in said first storage means and then sends a reset request to said reset means.

In the above-mentioned construction, the transmission means transmits each block with an error checking code added; and said reception means, upon receiving the block, checks an error in the received block by said error checking code.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

A preferred embodiment of the present invention will be described in detail with reference to accompanying drawings.

Figure 1:
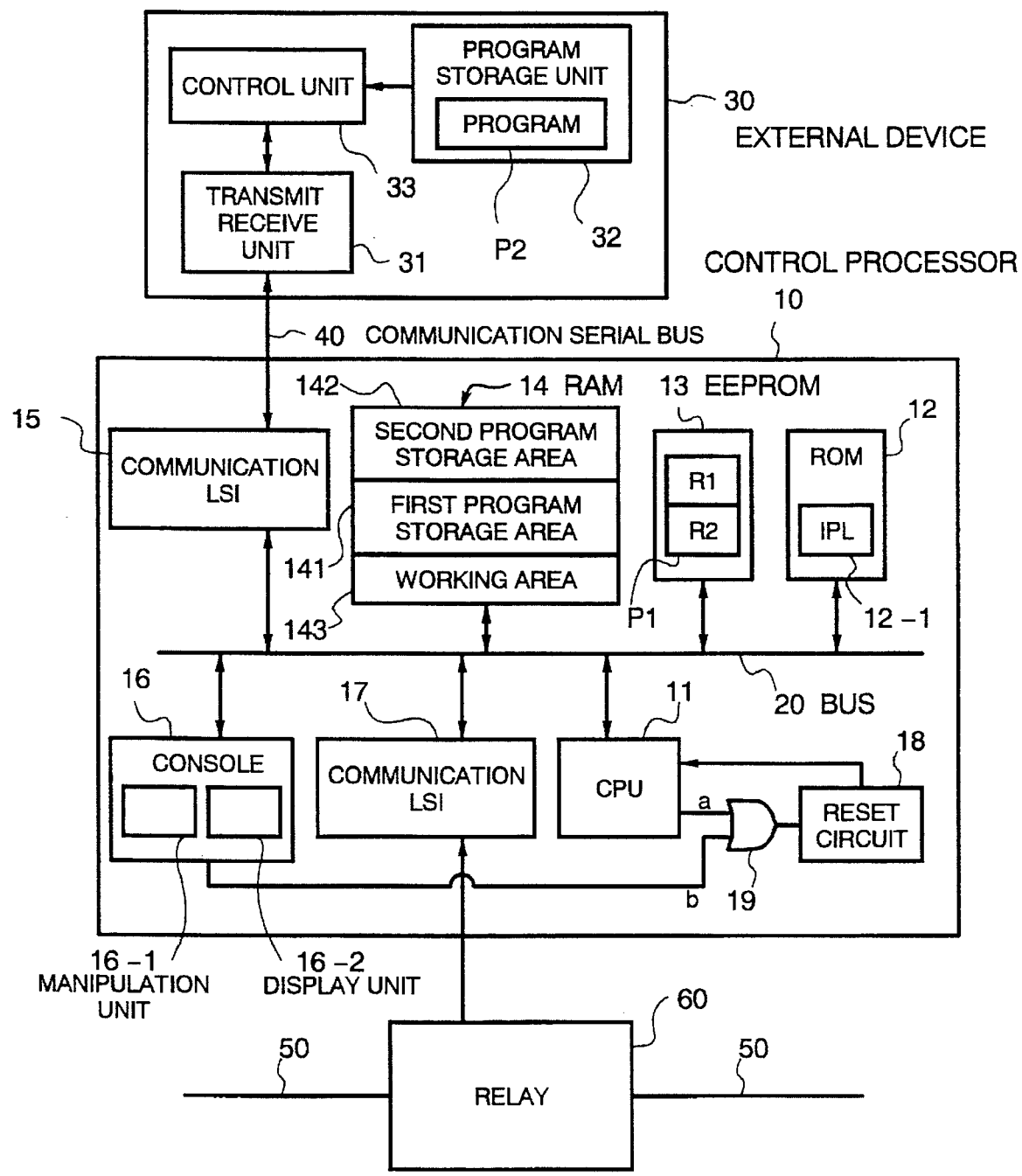
FIG. 1 is a block diagram showing an arrangement of a system implementing a program down-loading mode according to an embodiment of the present invention.

FIG. 1 is a block diagram showing an arrangement of a computer system implementing a program down-loading mode according to one embodiment of the present invention.

As shown in the figure, the computer system of the present embodiment, which is a monitor system for continually monitoring the state of a relay, comprises a control processor 10 operable under program control and an external device 30 for holding a new program. The control processor 10 and the external device 30 are connected to each other by a communication serial bus 40.

The control processor 10 of the present embodiment, as illustrated in FIG. 1, is connected to a relay 60 which transmits a signal such as a sound signal received from one transmission path 50 to the other transmission path 50. The control processor 10 then periodically collects and analyzes information on the internal state of the relay 60 and executes recovery processing etc. when a failure occurs.

For such a control processor 10 as this, wherein information is to be collected from the relay 60, a method of analyzing the collected information and the contents of recovery processing are in general defined by a program, updating of the analysis method and the like require updating of the program itself (e.g. updating by replacement by a new version). In addition, because the relay 60 is continually in operation, interruption of the monitoring of the relay 60 conducted by the control processor 10 due to the updating processing of the program should be avoided as much as possible.

The following is a detailed description of the arrangements of the control processor 10 and the external device 30.

The control processor 10 comprises a CPU 11, a ROM 12, an EEPROM 13, a RAM 14, communication LSIs 15 and 17 and a manipulation device 16 all connected to a bus 20. The processor 10 further comprises a reset circuit 18 for resetting the CPU 11 at power-on and starting and an OR gate 19 for activating the reset circuit 18 when a reset request signal a is output from the CPU 11 or a reset request signal b is output from the manipulation device 16.

The CPU 11 executes the above-described processing including monitoring and recovery of the relay 60 under program control.

The EEPROM 13, which is an Electrical Erasable Programmable Read Only Memory whose storage contents can be erasable, stores a program P1 including a routine R1 for ordinary processing and a routine R2 for download control. The EEPROM 13 can be replaced by other erasable and programmable memories such as a RAM. Ordinary processing in this embodiment is processing for monitoring the state of the relay and recovery when a fault exists.

The RAM 14 comprises a first program storage area 141 where the program P1 stored in the EEPROM 13 is developed, a second program storage area 142 for storing a new program P2 downloaded from the external device 30, and a working area 143 to be used for ordinary processing such as storage of processed data.

The CPU 11 executes processing under control of the program stored in the first program storage area 141. Since processing is conducted under control of the program P1 loaded from the EEPROM 13 into the first program storage area 141 of the RAM 14, rewrite of the storage contents of the EEPROM 13 during the ordinary processing will not affect the CPU 11 and cause any malfunction.

The ROM 12 stores an IPL program (Initial Program Loading Program) 12-1 for copying the program P1 stored in the EEPROM 13 in the first program storage area 141 of the RAM 14 at the time of activation and then transferring control to the routine R1 of the program P1 in the first program storage area 141.

The manipulation device 16 comprises a manipulation unit 16-1 for manipulation and for outputting various signals including a reset request command and a download start command and a display unit 16-2 for giving various displays such as an indication of normal and abnormal termination of down-loading. The manipulation unit 16-1 is implemented by a keyboard, a mouse or an input button provided for each processing, and the display unit 16-2 by a display, an indication lamp or the like.

The communication LSI 15 is connected to the external device 30 via a communication serial bus 40 and the communication LSI 17 to the relay 60.

The external device 30 comprises a transmit-receive unit 31 for transmitting and receiving data to/from the control processor 10 via the communication serial bus 40, a program storage unit 32 for storing the program P2 to be downloaded into and stored in the EEPROM 13 of the control processor 10, and a control unit 33 for controlling these units.

The program P2 stored in the program storage unit 32 is a program replacing the program P1 stored in the EEPROM 13 of the control processor 10 to conduct processing by the CPU 11. The program P2 is a later version of the program P1, a monitoring program of another kind, or the like. The program P2 therefore at least includes a routine corresponding to the monitoring routine R1 of the program P1.

Figure 2:
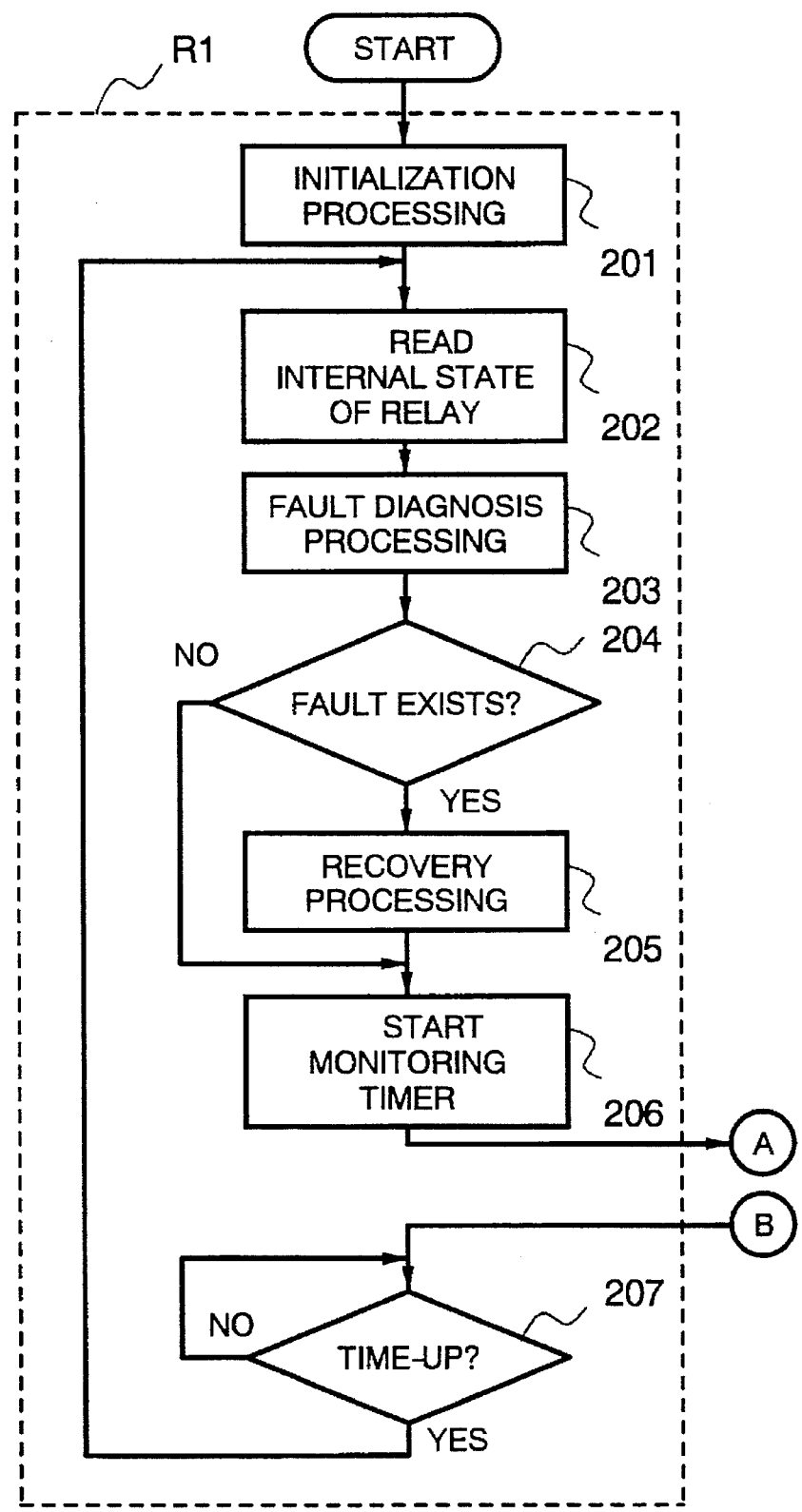
FIG. 2 is flow chart showing operation of ordinary processing according the present embodiment.
Figure 3:
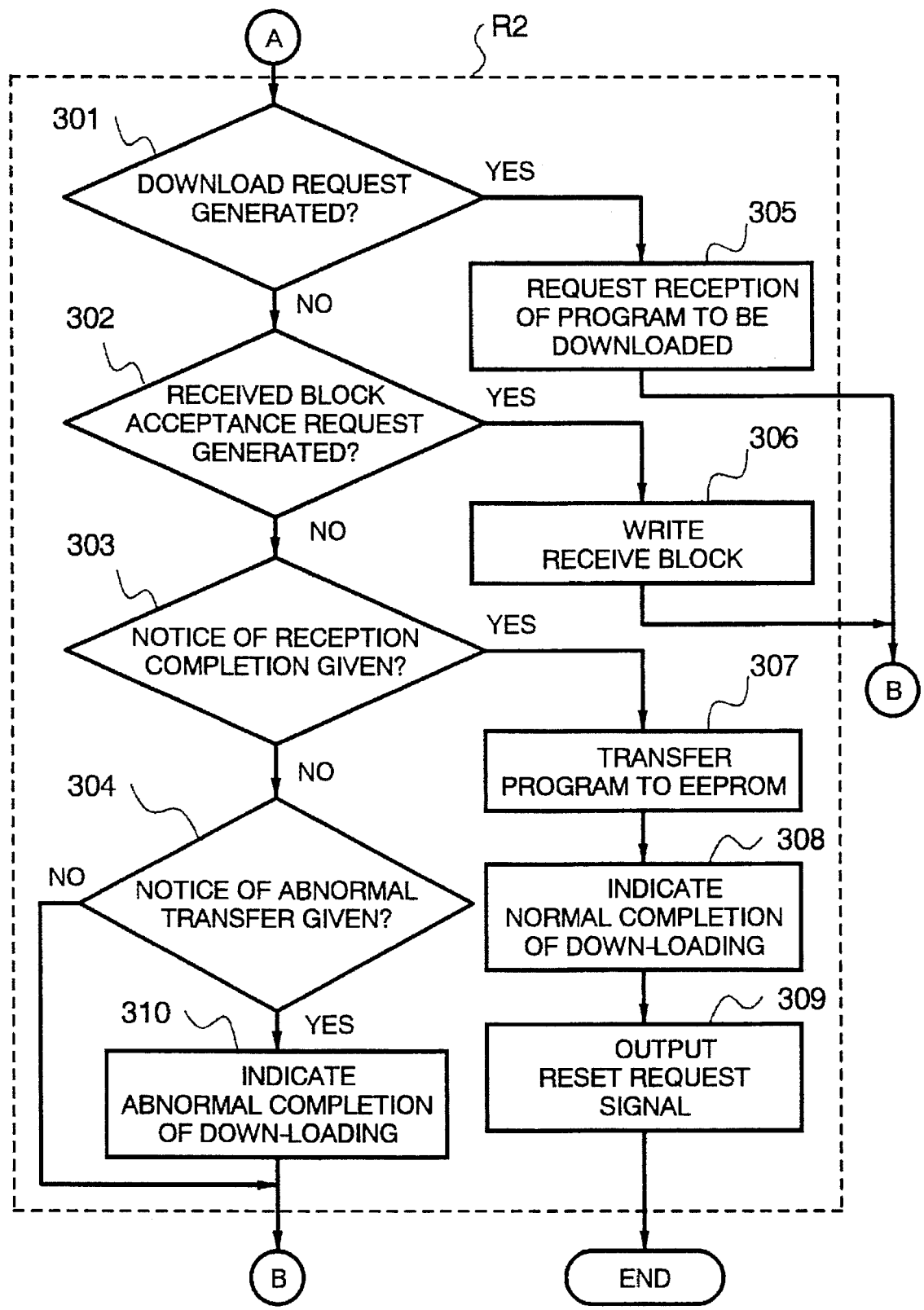
FIG. 3 is a flow chart showing operation of program down-loading processing according to the present embodiment.
Figure 4:
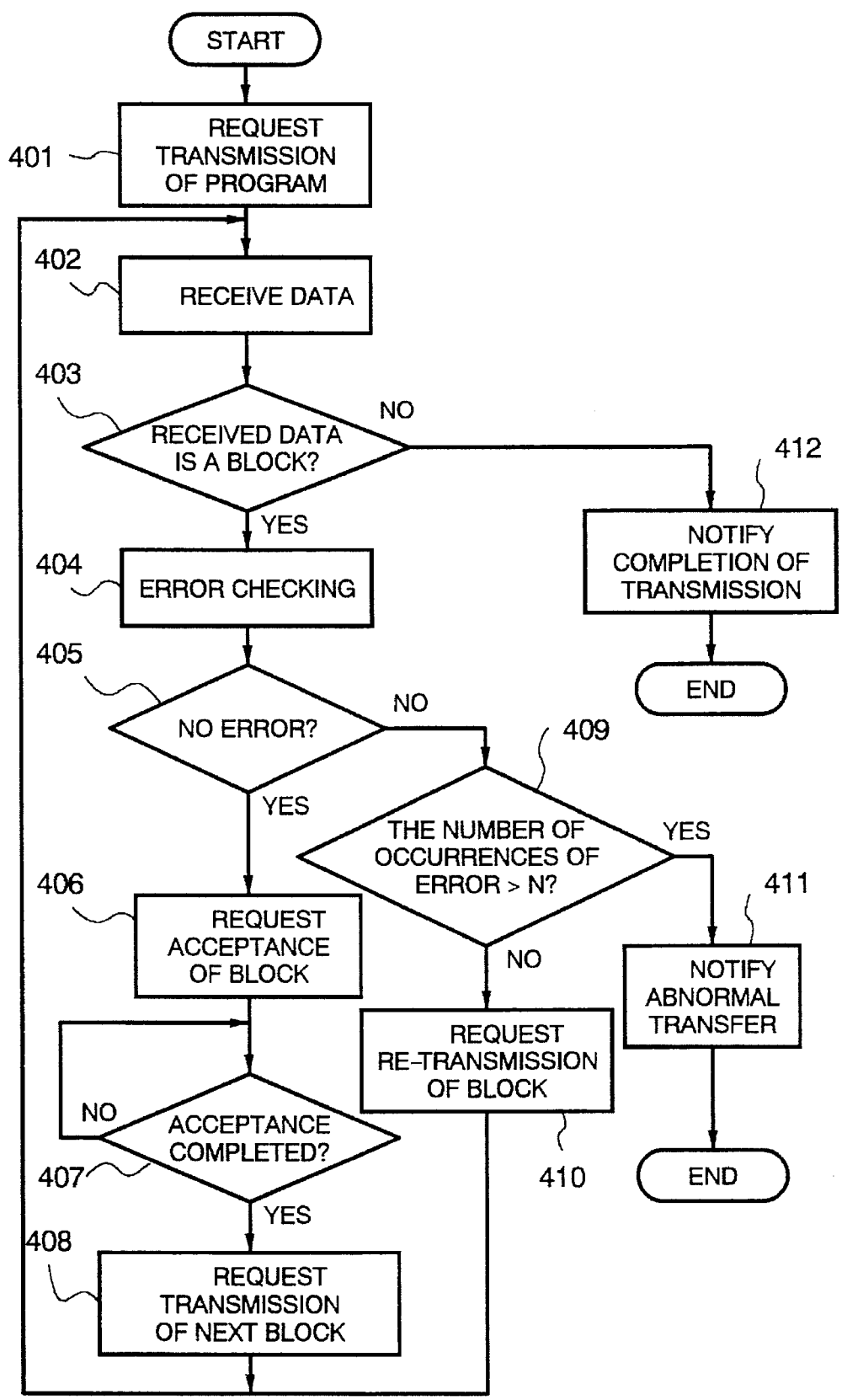
FIG. 4 is a flow chart showing operation of a communication LSI of a control device at the time of program down-loading according to the present embodiment.
Figure 5:
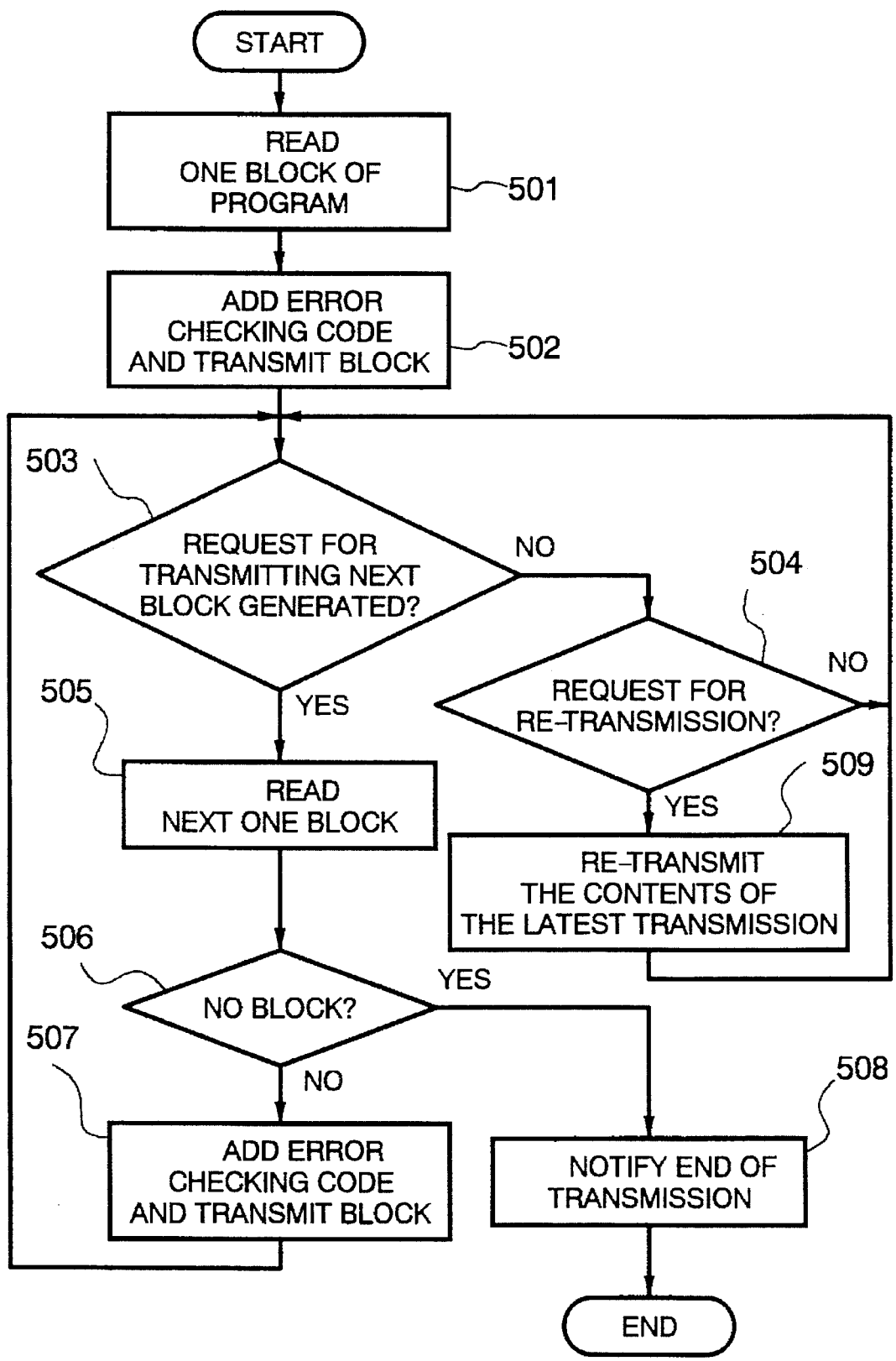
FIG. 5 is a flow chart showing operation of a transmit-receive unit in an external device at the time of program down-loading according to the present embodiment.

Operation of the present embodiment will be described in the following with reference to the flow charts of FIGS. 2 to 4. FIGS. 2 and 3 are flow charts each showing one example of processing by the CPU 11 in the control processor 10 under control of the current program P1. FIG. 4 is a flow chart showing operation of the communication LSI 15 in the control processor 10, which communicates with the external device 30 via the communication serial bus 40, and FIG. 5 is a flow chart showing operation of the control unit 33 in the external device 30.

Initially, when the power is applied to the control processor 10 or a reset request signal is output from the manipulation device 16 while the control processor 10 is in operation, the reset circuit 18 resets the CPU 11, so that the CPU 11 executes the IPL program 12-1 stored in the ROM 12. As a result, the program P1 stored in the EEPROM 13 is loaded in the first program storage area 14, of the RAM 14 and control transfers to the routine R1 of the program P1 loaded on the first program storage area 141 to execute monitoring of the relay 60 according to the routine R1.

In the execution of the program routine R1, after initialization of each unit of the control processor 10 (Step 201), first ordinary processing is started as shown in FIG. 2. More specifically, information on the internal state of the relay 60 is input through the communication LSI 17 (Step 202) to conduct a fault diagnosis through analyses of the input internal state information (Step 203). When no fault is detected in the relay 60, a monitoring timer in the CPU 11 is activated (Steps 204 and 206). On the other hand, when a fault is detected in the relay 60, necessary recovery processing is conducted (Steps 204 and 205) and then the monitoring timer is started (Step 206).

Since the CPU 11 periodically conducts a fault diagnosis of the relay 60 at predetermined intervals (at time intervals set by the monitoring timer), after the start of the monitoring timer until time-out of the same, operation for the ordinary processing is suspended to generate an idle time. In the present embodiment, therefore, the routine R2 for download control is executed by using the idle time. Because the down-loading is conducted using an idle time in the ordinary processing, even processing requiring the longest period of time in a sequence of down-loading processings should be completed within the idle time. An idle time set by the monitoring timer is therefore to be within a range appropriate for an idle time of the ordinary processing of the system and be sufficient for executing one (one block) down-loading processing.

In the processing according to the routine R2, determination is sequentially made as shown in FIG. 3 as to whether a request for downloading the program R2 is generated from the manipulation device 16 and whether a request for accepting a received block, notice of reception completion, and notice of abnormal transfer are given by the communication LSI 15 and relevant processing is executed when any such events are observed (Steps 301,302, 303 and 304). When no event is observed, the procedure immediately returns to the routine R1 to wait for time-out of the monitoring timer (Step 207), and at time-out of the monitoring timer, the routine returns to the processing in Step 202 to conduct a fault diagnosis of the relay 60 again.

When a program P2 downloading start signal is output from the manipulation device 16 while the above-described processing is being executed in the control processor 10, the manipulation device 16 generates an interrupt to the CPU 11 to store the generation of a download request in an internal register of the CPU 11.

Thereafter, execution by the CPU 11 proceeds to generate an idle time in the ordinary monitoring processing, and processing of the routine R2 is executed when the CPU 11 recognizes the generation of the download request by the contents of the internal register and gives a download program reception request to the communication LSI 15 (Steps 301 and 305). Then, the routine returns to the processing in Step 207 of the routine R1 to continue the ordinary monitoring processing. The download request existing in the external register is erased by the CPU 11 at the time it is recognized.

The communication LSI 15, when requested by the CPU 11 to receive the program to be downloaded, generates a request to the external device 30 for the transmission of the program P2 through the communication serial bus 40 as shown in FIG. 4 (Step 401).

The control unit 33 of the external device 30, which has received the program P2 transmission request through the transmit-receive unit 31, starts the processing shown in FIG. 5. More specifically, the unit 33 reads a part, as, for example, one block, of a predetermined length from the head of the program P2 stored in the program storage unit 32 (Step 501), adds an error checking code such as a parity bit to the block, and transmits the block from the transmit-receive unit 31 to the control processor 10 through the communication serial bus 40 (Step 502). The program P2 is thus transmitted in blocks each divided to a predetermined length from the head of the program, with the length set in advance. As mentioned above, even a processing requiring the longest period of time in a sequence of downloading processings should be completed within an idle time of the ordinary processing in the present embodiment. It is therefore necessary to set the length of the block such that one downloading processing is completed within an idle time in the ordinary processing.

As shown in FIG. 4, when the communication LSI 15 receives and stores one block of the program P2 sent from the external device 10 (Step 402), the LSI 15 performs error checking by an error checking code (Steps 403 and 404). When the received block includes no error, the LSI 15 generates an interruption to the CPU 11 to request acceptance of the received block (Step 406). As a result of the interruption, the generation of the request for accepting the received block is stored in the internal register of the CPU 11. Then, the communication LSI 15, after the received block is accepted by the CPU 11, requests the external device to transmit a next block (Steps 407 and 408).

When an error is detected in the received block (Step 405), determination is made whether the number of continuous occurrences of error exceeds an upper limit of N times set in advance (Step 409). If the number of continuous occurrences of error is not greater than N times, the LSI 15 requests the external device 30 to re-transmit the block (Step 410). On the other hand, when the number is not less than N times, determination is made that the cause of the error is a failure of the communication serial bus 40 etc. to generate an interruption to the CPU 11 and notify the same of the occurrence of abnormal transfer (Step 411). As a result of the interruption, the internal register of the CPU 11 records the notification of the abnormal transfer.

After the transmission of the first block, the control unit 33 of the external device 30 determines whether a request for transmitting a next block or a request for re-transmission is sent from the control processor 10 as shown in FIG. 5 (Steps 503 and 504). Then, when receiving the request for transmission of a next block, the control unit 33 reads the next block of the program P2 from the program storage unit 32

(Step 505) and adds an error checking code to transmit the block to the control processor 10 (Steps 506 and 507). When the last part (last block) of the program P2 has been already transmitted and there exists no block to be transmitted, the control unit 33 notifies the control processor 10 of the end of transmission and completes the processing (Steps 506 and 508). When re-transmission of the transmitted block is requested by the control processor 10, the unit 33 re-transmits the block transmitted the last time to the control processor 10 (Steps 504 and 509).

When the completion of the transmission is notified by the external device 30, the communication LSI 15 of the control processor 10 determines that the notification of the end of transmission has been received and generates an interruption to the CPU 11 to notify the same of the completion of reception (Steps 403 and 412) as shown in FIG. 4. As a result of the interruption, the internal register of the CPU 11 stores the completion of reception.

The CPU 11, which has requested the communication LSI 15 to receive the program to be downloaded at Step 305 of the routine R2 shown in FIG. 3, executes the routine R2 in every idle time of the following ordinary processings. Then, when one block at the head position of the program P2 is transmitted from the external device 30 and received by the communication LSI 15 and the CPU 11 recognizes generation of a request for accepting the received block in a manner as described above, the CPU 11 accepts the received block from the communication LSI 15 via the bus 20 and writes the same to the second program storage area 142 of the RAM 14 (Steps 302 and 306). The request for accepting the received block in the internal register is erased by the CPU 11 at the time it is recognized.

When the received block is accepted, the communication LSI 15 requests the external device 30 to transmit a next block as described above and upon receiving the block, requests the CPU 11 to accept the block. Then, the CPU 11 conducts processing of sequentially accepting following received blocks from the communication LSI 15 in an idle time of the ordinary processing and storing the accepted blocks in the program storage area 142 of the RAM 14.

When the communication LSI 15 receives the notice of the end of transmission from the external device 30 and gives notice of the end of reception to the CPU 11, the CPU 11 recognizes generation of the notice of reception end and transfers the program P2 stored in the second program storage area 142 to the EEPROM 13 to replace the original program P1 (Steps 303 and 307).

With the ordinary control processing being executed by the control processor 10, a new program can be downloaded from the external device 30 into the control processor 10 and written in the EEPROM 13 in a manner as described in the foregoing.

Thereafter, indication of the normal completion of down-loading is given by the display unit of the manipulation device 16 (Step 308) and a reset request signal a is output (Step 309). The CPU 11 is responsively reset by the reset circuit 18, so that the IPL program 12-1 in the ROM 12 is executed to cause loading of the program P2 stored in the EEPROM 13 into the first program storage area 141 of the RAM 14, leading to execution of the program P2.

When normal reception of some block of the program P2 is not normally made due to a failure of the communication serial bus 40 etc. and notice of abnormal transfer is given from the communication LSI 15 to the CPU 11 as described in the foregoing, the CPU 11 recognizes the notice of abnormal transfer to indicate the abnormal completion of down-loading on the display unit of the manipulation device 16 (Steps 304 and 310).

The operator can find that down-loading is abnormally ended by the display indicative of the abnormal completion of down-loading on the manipulation device 16. The operator can also recognize that down-loading is normally completed by the display indicative of the normal completion of down-loading. Furthermore, when down-loading is ended without making any display, it can be determined that the control processor 10 itself develops a fault. Thus, when a failure occurs in the control processor 10 itself, resetting of the CPU 11 through external operation can lead to recovery of the control processor 10 by the original program P1 stored in the EEPROM 13.

As described in the foregoing, the program down-loading mode of the present invention has the following effects.

First, this mode allows new program downloading processing to be carried out while continuing ordinary processing under control of a program currently in use. It is therefore not necessary to stop primary control operation of the control processor at the down-loading of a new program. In addition, since the CPU is reset upon completion of the down-loading of the new program, it is possible to quickly start operation under control of the downloaded program.

Second, since the CPU executes download control in an idle time of the ordinary processing, effects of the download control on the ordinary processing can be reduced.

Third, by transferring a program from the external device to the communication circuit on the basis of an individual block obtained by dividing a program into a plurality of blocks to reduce the volume of processing required for each transfer, intermittent idle times can be effectively used, thereby mitigating effects on the ordinary processing.

Forth, with the manipulation device provided in the display unit indicating whether down-loading is normally completed or not, an operator can easily recognize normal completion or abnormal completion of down-loading and quickly cope with it.

Fifth, when neither an indication of normal completion of down-loading nor an indication of abnormal completion is given on the display unit of the manipulation device after the down-loading is started, the operator can recognize that abnormality occurs in the control processor itself and quickly restore the control processor, by resetting the CPU, to the original state before the down-loading of a new program.

Although in the present embodiment, description is given of an application to a control processor which is connected to a relay provided on a transmission path to periodically collect and analyze information on the internal state of the relay and execute recovery processing etc. when a failure occurs, the program down-loading mode of the present invention is also applicable, for example, to a system with redundancy which, when a predetermined device develops a fault and operation of the device should be executed by a spare device, needs to avoid interruption of the operation caused by program updating processing as much as possible.

What is claimed is:

1. A program download type information processor comprising:

control means including a CPU for executing programmed control; and external storage means for storing a new program replacing a current program being executed by the CPU of said control means;

said control means including:
  first storage means for storing a program for executing ordinary processing and program download control; and
  second storage means having a first storage area for loading the program stored in said first storage means to be executed by said CPU and a second storage area for storing a new program downloaded from said external storage means;
said CPU, at its activation, executing ordinary processing under control of said ordinary processing program loaded from said first storage means into the first storage area of said second storage means; and
said CPU executing said download control program without stopping said ordinary processing, to download said new program stored in said external storage means into the second storage area of said second storage means and store said new program into said first storage means after the down-loading.

2. The program download type information processor according to claim 1, wherein said download control program is executed at a timing when an idle time is generated in said ordinary processing by said CPU.

3. The program download type information processor according to claim 1, further comprising third storage means for storing an IPL program for loading said ordinary processing program from said first storage means into the first storage area of said second storage means.

4. The program download type information processor according to claim 1, wherein
  download control of said program is executed at a timing when an idle time is generated in execution of said ordinary processing program by said CPU; and
  in execution of said download control program, the new program in said external storage means is divided into a plurality blocks, and the new program is downloaded into the second storage area of said second storage means on the basis of said plurality of blocks.

5. The program download type information processor according to claim 1, further comprising reset means for executing reset of said CPU at a time point when said new program downloaded from said external storage means into the second storage area of said second storage means is stored in said first storage means.

6. The program download type information processor according to claim 1, further comprising input means for providing a request for downloading said new program to said CPU, said CPU executing said download control program in an idle time of said ordinary processing program when receiving the download request from said input means.

7. The program download type information processor according to claim 1, further comprising:
  input means for providing a request for downloading said new program to said CPU and generating a reset of said CPU;
  notifying means for notifying normal completion and abnormal completion of down-loading of said new program; and
  reset means for executing reset of said CPU;
wherein
  in an idle time of said ordinary processing program, said CPU executes said download control program when receiving the download request from said input means;
  at a time point when said new program downloaded from said external storage means into the second storage area of said second storage means is stored in said first storage means, said CPU notifies normal completion of the down-loading through said notifying means and said reset means executes reset of said CPU; and
  said CPU notifies abnormal completion of the downloading through said notifying means when said new program is not normally downloaded from said external storage means into the second storage area of said second storage means.

8. A program download type information processor comprising:
  control means including a CPU for executing programmed control; and
  external storage means for storing a new program replacing a current program being executed by the CPU of said control means;
  said control means including:
    first storage means for storing a program for executing ordinary processing and program download control;
    second storage means having a first storage area for loading the program stored in said first storage means to be executed by said CPU and a second storage area for storing a new program downloaded from said external storage means; and
    reception processing means connected to said external storage means via a communication medium for executing reception of said new program;
  said external storage means including:
    transmission processing means for executing transmission of said new program to said communication means;
  said CPU, at its activation, executing ordinary processing under control of said ordinary processing program loaded from said first storage means into the first storage area of said second storage means;
  said CPU executing download control by said downlaod control program without stopping said ordinary processing; program and
  in download control, said CPU storing said new program received from said external storage means through said reception means in the second storage area of said second storage means and then storing said new program in said first storage means.

9. The program download type information processor according to claim 8, wherein said download control program is executed during an idle time in said ordinary processing program.

10. The program download type information processor according to claim 8, further comprising third storage means for storing an IPL program for loading said program from said first storage means into the first storage area of said second storage means.

11. The program download type information processor according to claim 8, wherein
  download control of said program is executed at a timing when an idle time is generated in execution of said ordinary processing program by said CPU;
  in execution of said download control program, the new program in said external storage means is divided into a plurality blocks, and the new program is downloaded into the second storage area of said second storage means on the basis of said plurality of blocks; and
  said CPU, at every reception of one block by said reception means, stores the received one block in the second storage area of said second storage means and then continues execution of said ordinary processing program.

12. The program download type information processor according to claim 8, further comprising reset means for executing reset of said CPU at a time point when said new program downloaded from said external storage means into the second storage area of said second storage means is stored in said first storage means.

13. The program download type information processor according to claim 8, further comprising input means for providing a request for downloading said new program to said CPU, said CPU executing said download control program in an idle time of said ordinary processing program when receiving the download request from said input means.

14. The program download type information processor according to claim 8, further comprising:

input means for providing a request for downloading said new program to said CPU and generating a reset of said CPU;

notifying means for notifying normal completion and abnormal completion of down-loading of said new program; and reset means for executing reset of said CPU;

wherein in an idle time of said ordinary processing program, said CPU executes said download control program when receiving the download request from said input means;

at a time point when said new program downloaded from said external storage means into the second storage area of said second storage means is stored in said first storage means, said CPU notifies normal completion of the down-loading through said notifying means and said reset means executes reset of said CPU; and said CPU notifies abnormal completion of the downloading through said notifying means when said new program is not normally downloaded from said external storage means into the second storage area of said second storage means.

15. The program download type information processor according to claim 8, further comprising input means for providing a request for downloading said new program to said CPU and reset means for executing reset of said CPU, wherein said CPU executes said download control program when an idle time is generated in said ordinary processing program, and within the idle time of said ordinary processing program, when a download request is generated from said input means, sends a request for receiving said new program to said reception mean;

said reception means, upon receiving the reception request, sends a transmission request to the transmission means of said external storage means;

said transmission means, upon receiving said transmission request, divides the new program in said external means into a plurality of blocks and sequentially transmits the new program on the basis of said plurality of blocks to said reception means;

said reception means, at every reception of one block, sends a request for writing the block to said CPU;

said CPU stores said received block in the second storage area of said second storage means in response to said writing request; and said CPU, in response to notice of reception completion of all blocks given by said reception means, stores said new program stored in the second storage area of said second storage means in said first storage means and then sends a reset request to said reset means.

16. The program download type information processor according to claim 15, wherein said transmission means transmits each block with an error checking code added; and said reception means, upon receiving the block, checks an error in the received block by said error checking code.

* * * * *